(12) United States Patent
Huang

(10) Patent No.: US 8,601,698 B2
(45) Date of Patent: Dec. 10, 2013

(54) GARDEN SHEARS THAT AVOID LOOSENING OF A SHAFT PIN

(75) Inventor: Yao-Chung Huang, Chang Hua Hsien (TW)

(73) Assignee: Ho Cheng Garden Tools Co., Ltd., Fu Shing Hsiang, Chang Hua Hsien (TW)

( * ) Notice: Subject to any disclaimer, the term of this patent is extended or adjusted under 35 U.S.C. 154(b) by 250 days.

(21) Appl. No.: 13/023,526

(22) Filed: Feb. 8, 2011

(65) Prior Publication Data
US 2012/0198705 A1  Aug. 9, 2012

(51) Int. Cl.
*B26B 1/00* (2006.01)
*B26B 17/00* (2006.01)

(52) U.S. Cl.
USPC ............... 30/123; 30/123.3; 30/186; 30/192

(58) Field of Classification Search
USPC ......... 30/123.3, 123, 251, 185, 186, 192, 191
See application file for complete search history.

(56) References Cited

U.S. PATENT DOCUMENTS

| | | | | | |
|---|---|---|---|---|---|
| 933,667 | A | * | 9/1909 | Ritzler | 30/270 |
| 1,640,635 | A | * | 8/1927 | Atkins | 47/1.7 |
| 2,053,864 | A | * | 9/1936 | Cook et al. | 16/274 |
| 2,307,489 | A | * | 1/1943 | Coats | 30/267 |
| 3,672,053 | A | * | 6/1972 | Wiss | 30/267 |
| 5,581,888 | A | * | 12/1996 | Lewis | 30/123.3 |
| 5,862,572 | A | * | 1/1999 | Lin et al. | 16/405 |
| 6,131,291 | A | * | 10/2000 | Mock | 30/266 |
| 6,260,277 | B1 | * | 7/2001 | Wu | 30/232 |
| 6,532,668 | B1 | * | 3/2003 | Bloom et al. | 30/123.3 |
| 6,675,481 | B2 | * | 1/2004 | Wu | 30/123.3 |
| 6,935,031 | B1 | * | 8/2005 | Huang | 30/250 |
| 6,966,115 | B2 | * | 11/2005 | Deville | 30/250 |
| 7,127,819 | B1 | * | 10/2006 | Huang | 30/92 |
| 7,497,016 | B1 | * | 3/2009 | Wu | 30/254 |
| 2003/0159292 | A1 | * | 8/2003 | Wu | 30/123.3 |
| 2005/0172499 | A1 | * | 8/2005 | Huang | 30/250 |
| 2006/0067787 | A1 | * | 3/2006 | Nelson et al. | 403/408.1 |
| 2007/0079512 | A1 | * | 4/2007 | Nelson et al. | 30/123.3 |
| 2008/0022533 | A1 | * | 1/2008 | Zeller et al. | 30/134 |
| 2008/0155835 | A1 | * | 7/2008 | Lin | 30/252 |
| 2008/0168663 | A1 | * | 7/2008 | Yang et al. | 30/254 |
| 2010/0064526 | A1 | * | 3/2010 | Nelson et al. | 30/191 |
| 2010/0064529 | A1 | * | 3/2010 | Nelson et al. | 30/275.4 |
| 2010/0162575 | A1 | * | 7/2010 | Lin | 30/245 |
| 2011/0203117 | A1 | * | 8/2011 | Huang | 30/254 |
| 2011/0283545 | A1 | * | 11/2011 | Wu | 30/250 |
| 2012/0017445 | A1 | * | 1/2012 | Huang | 30/192 |

* cited by examiner

*Primary Examiner* — Omar Flores Sanchez

(57) ABSTRACT

Garden shears that avoid loosening of a shaft pin has shears having overlapped first and second cutting members, the first cutting member and second cutting member respectively connected to a first handle and a second handle. The first and second cutting members are secured with the shaft set. The shaft set has a threaded shaft pin, a washer, a threaded securing member and at least two engaging members. when the shears are assembled with the shaft set, the threaded securing member respectively has one engaging member on each side, and the engaging teeth of the threaded securing member engage with the two engaging members to prevent the threaded securing member from loosening due to the repeated opening and closing movements of the shears, and which can improve the smoothness of the operation of the shears and increase both safety and convenience.

1 Claim, 9 Drawing Sheets

GARDEN SHEARS THAT AVOID LOOSENING OF A SHAFT PIN

BACKGROUND OF THE INVENTION

1. Field of the Invention

The present invention relates to garden shears that avoid loosening of a shaft pin, and more particularly shears that are assembled with a shaft set having a threaded securing member having an engaging member on each side, and engaging teeth of the threaded securing member engage with the two engaging members to prevent the threaded securing member from loosening from repeated opening and closing movements of the shears, which can improve smoothness of use and increase both safety and convenience.

2. Description of the Related Art

Currently, prior art shears with a shaft locking structure are as shown in FIG. 9, and comprise shears 30, a shaft 40, and a locking member 50. The shears 30 have two crossover cutting members 31 each respectively having a through aperture 311 pivoted together with a shaft pin 40. An insertion hole 312 is placed above the through aperture 311 of the cutting member 31. The securing member 50 is an elastic plate jacketed onto the shaft pin 40 and set adjacent to one of the cutting members 31. The securing member 50 comprises a bent section 51, a back section 52, two engaging legs 53 and a tongue 54. The bent section 51 is bent downwardly and connected to the back section 52 and the two engaging legs 53. The back section 52 is placed against the cutting member 31 and adjacent to a through aperture 55, and the two engaging legs 53 are disposed symmetrically and parallel with the back section 52. A hexagonal opening 56 is formed between the two engaging legs 53, and the through aperture 55 is located to correspond to a center of the opening 56. The shaft pin 40 is placed through the through aperture 55 and the hexagonal opening 56, and the tongue 54 is inserted into insertion hole 312. Finally, a locking member 41 is secured onto the shaft pin 40 and engaged with the opening 56, which is used to prevent the locking member 41 from loosening due to movement of the shears 30.

The above-mentioned prior art has the following drawbacks: The securing member 50 is used for securing the locking member 41 and the shaft pin 40 together. The opening 56 is engaged with the locking member 41, and the securing member 50 utilizes the tongue 54 to attach to the insertion hole 312 of the cutting member 31. When the shears 30 are opened and closed, the securing member 50 may correspondingly rotate with this movement, which can loosen the locking member 41.

Therefore, it is desirable to provide improved shears to mitigate and/or obviate the aforementioned problems.

SUMMARY OF THE INVENTION

An objective of the present invention is to provide garden shears that avoid loosening of a shaft pin.

In order to achieve the above-mentioned objectives, embodiment garden shears of the invention comprises shears and a shaft set. The shears have overlapped first and second cutting members. The first cutting member and second cutting member are respectively connected to a first handle and a second handle. The first cutting member has a through aperture, and the through aperture includes a lubrication gap. The first cutting member further has an engaging end extending from a rear end. The second cutting member has a non-circular engaging aperture corresponding to the through aperture of the first cutting member. A limiting member is coupled to an outer side of the second cutting member behind the engaging aperture, and a slot is disposed in the limiting member and through the second cutting member. The limiting member further has limiting protrusions on a front section of both edges of the slot. Furthermore, a first positioning member and a second positioning member are respectively disposed on two outer sides of the slot and engaged in the slot. The second handle of the second cutting member further has an opening corresponding to the second positioning member. The first handle has a first engaging column and the second handle has a corresponding buffering member. The buffering member has a second engaging column on a side and an elastic member disposed between the first and second engaging columns. A shaft set has a threaded shaft pin, a washer, a threaded securing member and at least two engaging members. The threaded shaft pin comprises a head end, a neck section and a threaded section. The head end has an axial oil filling aperture, an outer wall of the neck section has a gap, and an oil outlet is connected to the oil filling hole. Moreover, an oil groove is disposed around an outer edge of the neck section. The washer is correspondingly engaged with the through aperture of the first cutting member and has an assembling aperture. The threaded securing member and the threaded shaft pin are capable of being locked together. The threaded securing member further has a plurality of engaging teeth on an outer edge and the at least two engaging members have a plurality of engaging teeth that engage with the engaging teeth of the threaded securing member.

The first cutting member and the second cutting member are respectively connected to the first handle and the second handle to provide the shears. The first positioning member and the second positioning member are pivoted with each other through the slot of the second cutting member, and the second positioning member is disposed on an inner side of the second cutting member and is capable of being accepted in the opening of the second handle. First, the first cutting member and the second cutting member overlap each other, and the through aperture and the engaging aperture are aligned, with the shaft set placed through and secured with the through aperture and the engaging aperture. To assemble the shaft set, the washer is disposed into the through aperture of the first cutting member, and then the threaded shaft pin is placed through the washer. Therefore, the head end of the threaded shaft pin is limited by the washer, the neck section passes through the through aperture of the washer, the gap engages with the engaging aperture of the second cutting member, and the threaded section protrudes from the engaging aperture. The threaded securing member is provided on one side of the second cutting member and engages with the threaded section, and an engaging member is respectively provided on opposite sides of the threaded securing member on the second cutting member. The engaging teeth of the engaging members are engaged with the engaging teeth of the threaded securing member to prevent the threaded securing member from loosening The elastic member is disposed between the first handle and the second handle, and two opposite ends of the elastic member are respectively jacketed onto the first and second engaging columns.

With the above-mentioned structure, the following benefits can be obtained: when the shears are assembled with the shaft set, the threaded securing member respectively has one engaging member on each side, and the engaging teeth of the threaded securing member engage with the two engaging members to prevent the threaded securing member from loosening due to the repeated opening and closing movements of the shears, and which can improve the smoothness of the operation of the shears and increase both safety and convenience.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
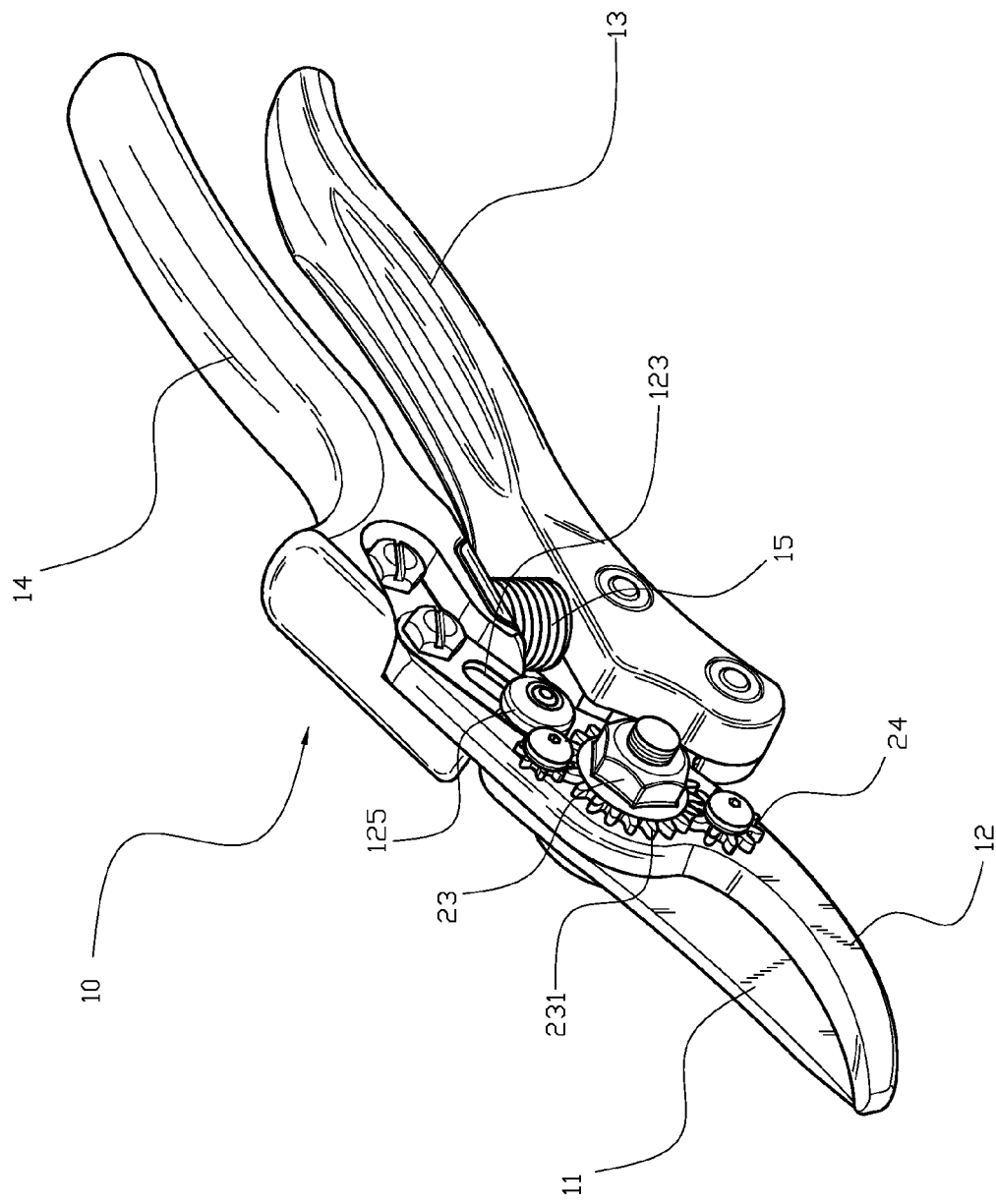
FIG. 1 is a perspective view of an embodiment of the present invention.
Figure 2:
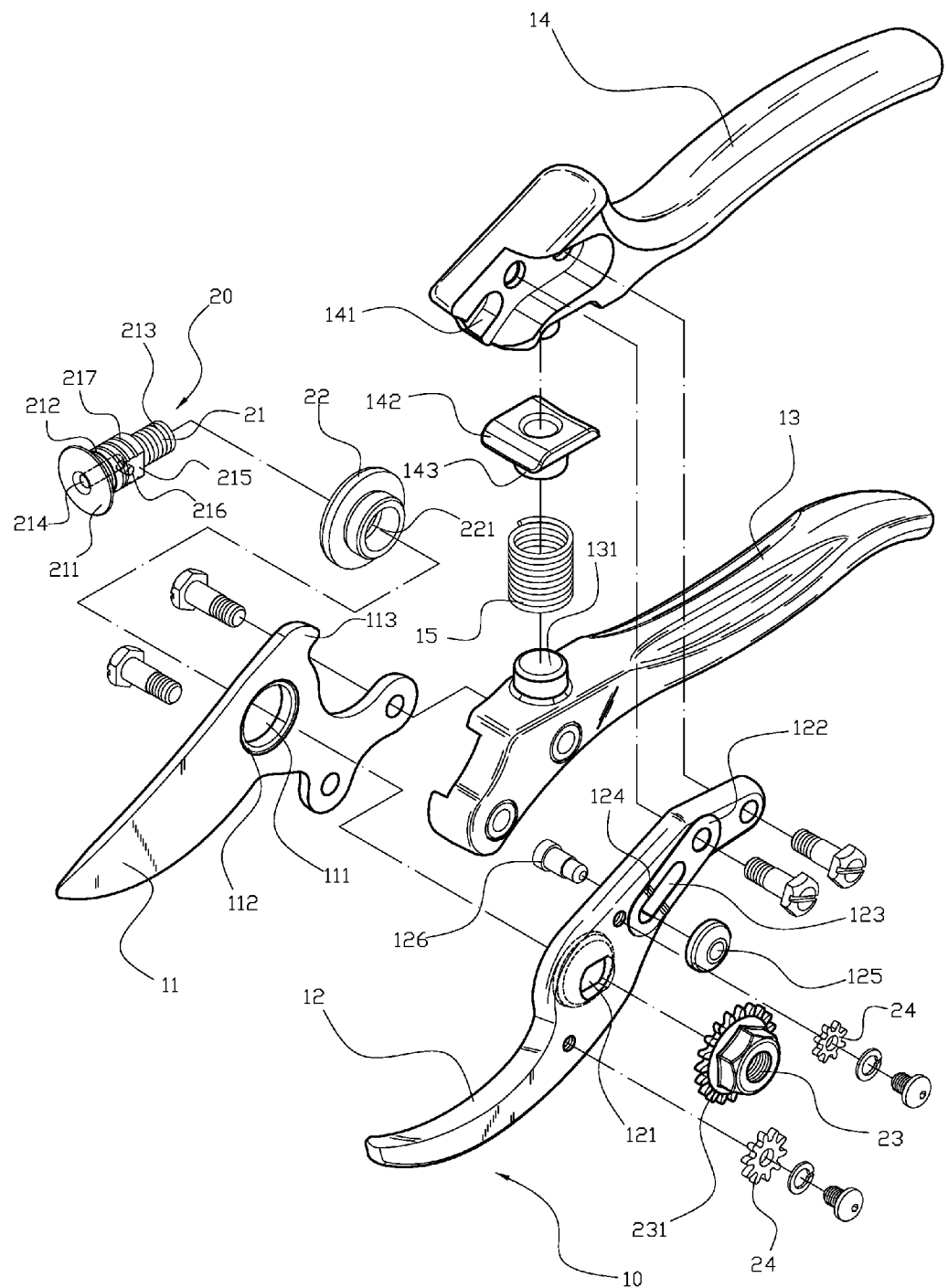
FIG. 2 is an exploded view of an embodiment of the present invention.

First, please refer to FIGS. 1 and 2. Embodiment garden shears comprise shears 10 and a shaft set 20. The shears 10 have overlapped first cutting member 11 and second cutting member 12. The first cutting member 11 and second cutting member 12 are respectively connected to a first handle 13 and a second handle 14. The first cutting member 11 has a through aperture 111, and the through aperture 111 includes a lubrication gap 112. The first cutting member further has an engaging end 113 extending from a rear end. The second cutting member has a non-circular engaging aperture 121 corresponding to the through aperture 111 of the first cutting member 11. A limiting member 122 is coupled to an outer side of the second cutting member 12 behind the engaging aperture 121, and a slot 123 is disposed in the limiting member 122 and through the second cutting member 12. The limiting member 122 further has limiting protrusions 124 on a front section of both edges of the slot 123. Furthermore, a first positioning member 125 and a second positioning member 126 are respectively disposed on two outer sides of the slot 123 and engaged in the slot 123. The second handle 14 of the second cutting member 12 further has an opening 141 corresponding to the second positioning member 126. The first handle 13 has a first engaging column 131 and the second handle 14 has a corresponding buffering member 142. The buffering member 142 had a second engaging column 143 on a side and an elastic member 15 disposed between the first and second engaging columns 131, 143. A shaft set 20 has a threaded shaft pin 21, a washer 22, a threaded securing member 23 and at least two engaging members 24. The threaded shaft pin 21 comprises a head end 211, a neck section 212 and a threaded section 213. The head end 211 has an axial oil filling aperture 214, an outer wall of the neck section 212 has a gap 215, and an oil outlet 216 is connected to the oil filling hole 214. Moreover, an oil groove 217 is set around an outer edge of the neck section 212. The washer 22 is correspondingly engaged with the through aperture 111 of the first cutting member 11 and has an assembling aperture 221. The threaded securing member 23 and the threaded shaft pin 21 are capable of being locked together. The threaded securing member 23 further has a plurality of engaging teeth 231 on an outer edge and the at least two engaging members 24 have a plurality of engaging teeth engaged with the engaging teeth 231 of the threaded securing member 23.

Figure 3:
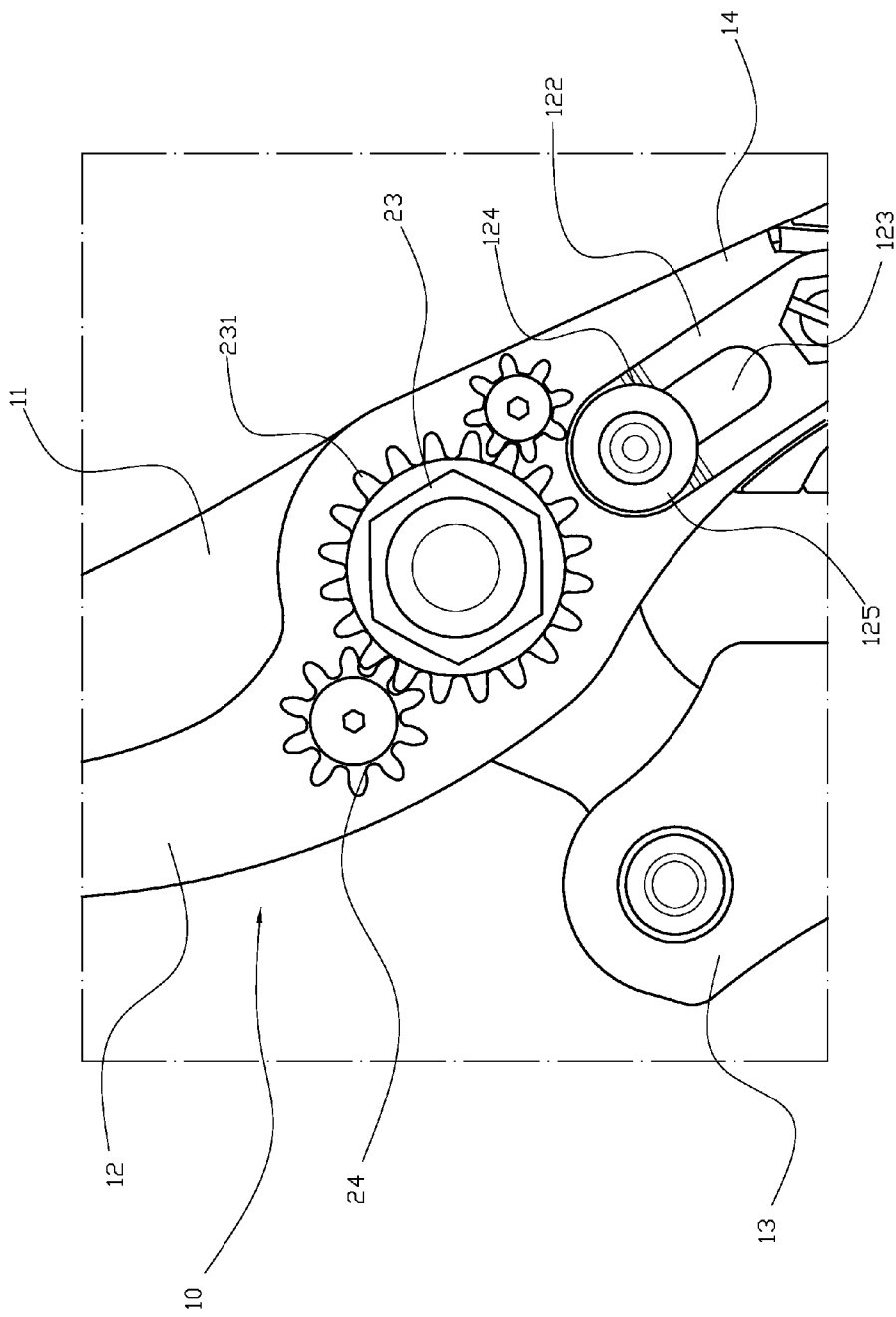
FIG. 3 is a local detailed view of an embodiment of the present invention.

For actual assembly, please refer to FIGS. 1, 2 and 3. The first cutting member 11 and the second cutting member 12 are respectively connected to the first handle 13 and the second handle 14 to provide the shears 10. The first positioning member 125 and the second positioning member 126 are pivoted with each other through the slot 123 of the second cutting member 12, and the second positioning member 126 is disposed on an inner side of the second cutting member 12 and is capable of being accepted in the opening 141 of the second handle 14. First, the first cutting member 11 and the second cutting member 12 overlap each other, and the through aperture 111 and the engaging aperture 121 are aligned, with the shaft set 20 placed through and secured with the through aperture 111 and the engaging aperture 121. To assemble the shaft set 20, the washer 22 is disposed into the through aperture 111 of the first cutting member 11, and then the threaded shaft pin 21 is placed through the washer 22. Therefore, the head end 211 of the threaded shaft pin 21 is limited by the washer 22, the neck section 212 passes through the through aperture 221 of the washer 22, the gap 215 engages with the engaging aperture 121 of the second cutting member 12, and the threaded section 213 protrudes from the engaging aperture 121. The threaded securing member 23 is provided on one side of the second cutting member 12 and engages with the threaded section 213, and an engaging member 24 is respectively provided on opposite sides of the threaded securing member 23 on the second cutting member 12. The engaging teeth of the engaging members 24 are engaged with the engaging teeth 231 of the threaded securing member 23 to prevent the threaded securing member 23 from loosening The elastic member 15 is disposed between the first handle 13 and the second handle 14, and two opposite ends of the elastic member 15 are respectively jacketed onto the first and second engaging columns 131, 143.

Figure 4:
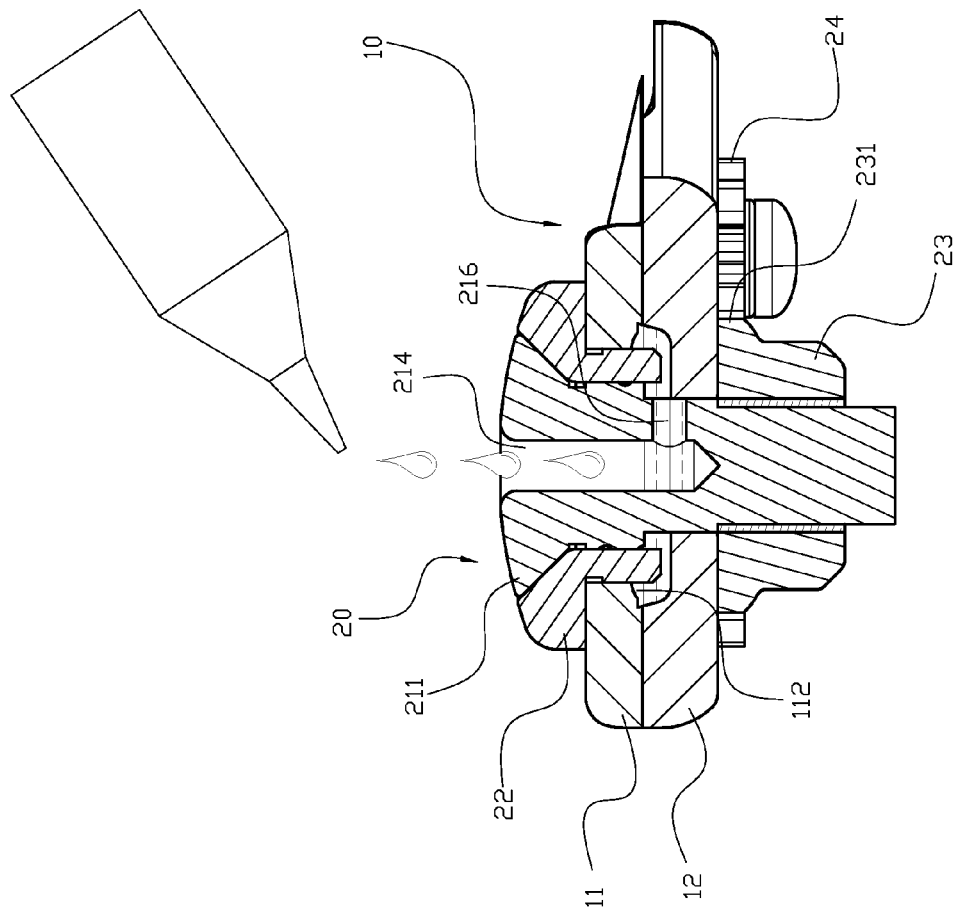
FIG. 4 is a cross-sectional view of an embodiment of the present invention.

For actual operations please refer to FIG. 4. The threaded shaft pin 21 of the shaft set 20 further includes the oil filling hole 214 for accepting lubricant; therefore, the oil flows out of the oil outlet 216 and through the oil grooves 217 of the neck section 212 to enter between the first and second cutting members 11, 12, providing a smoother movement for the shears 10.

Figure 5:
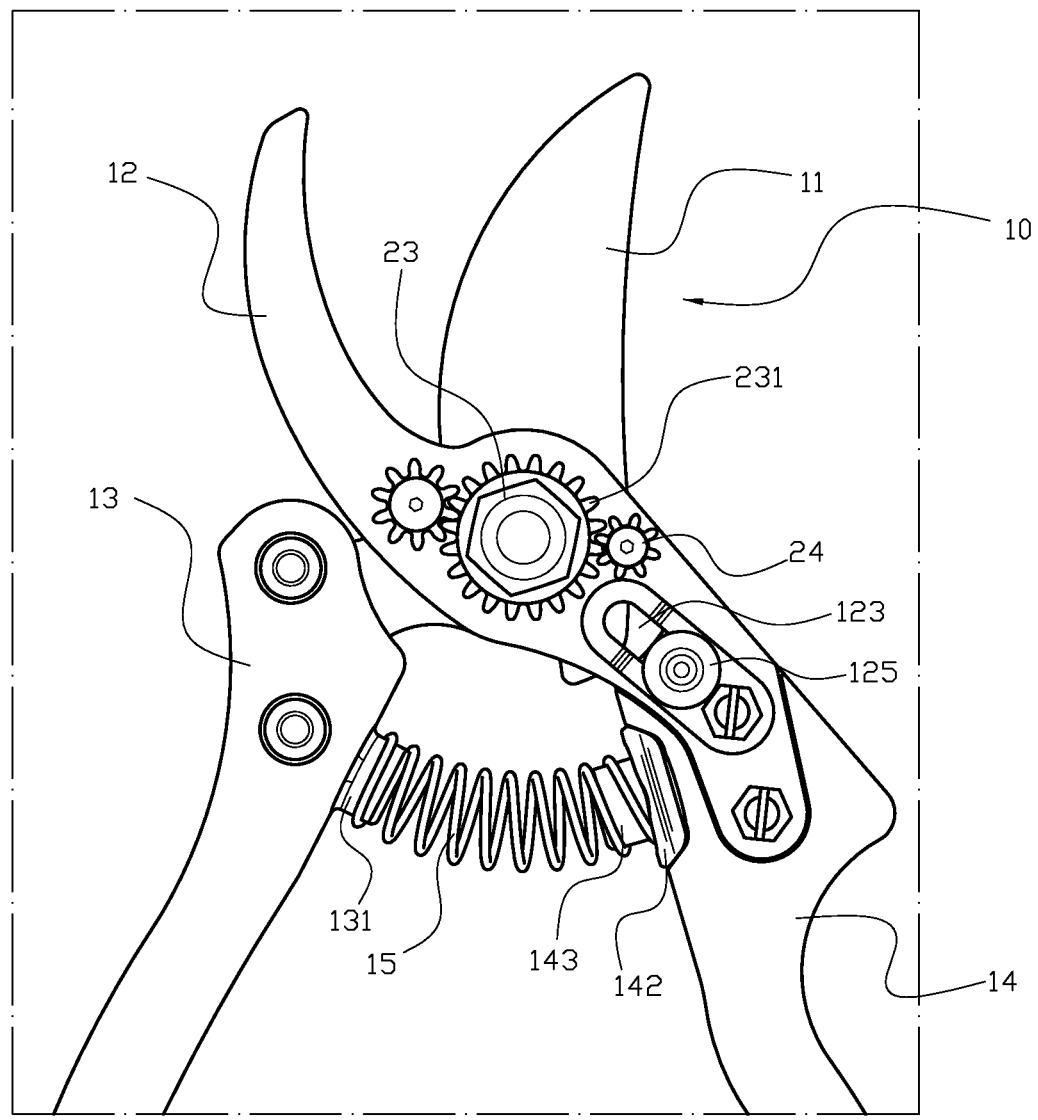
FIG. 5 is a schematic drawing showing an opening movement of an embodiment of the present invention.
Figure 6:
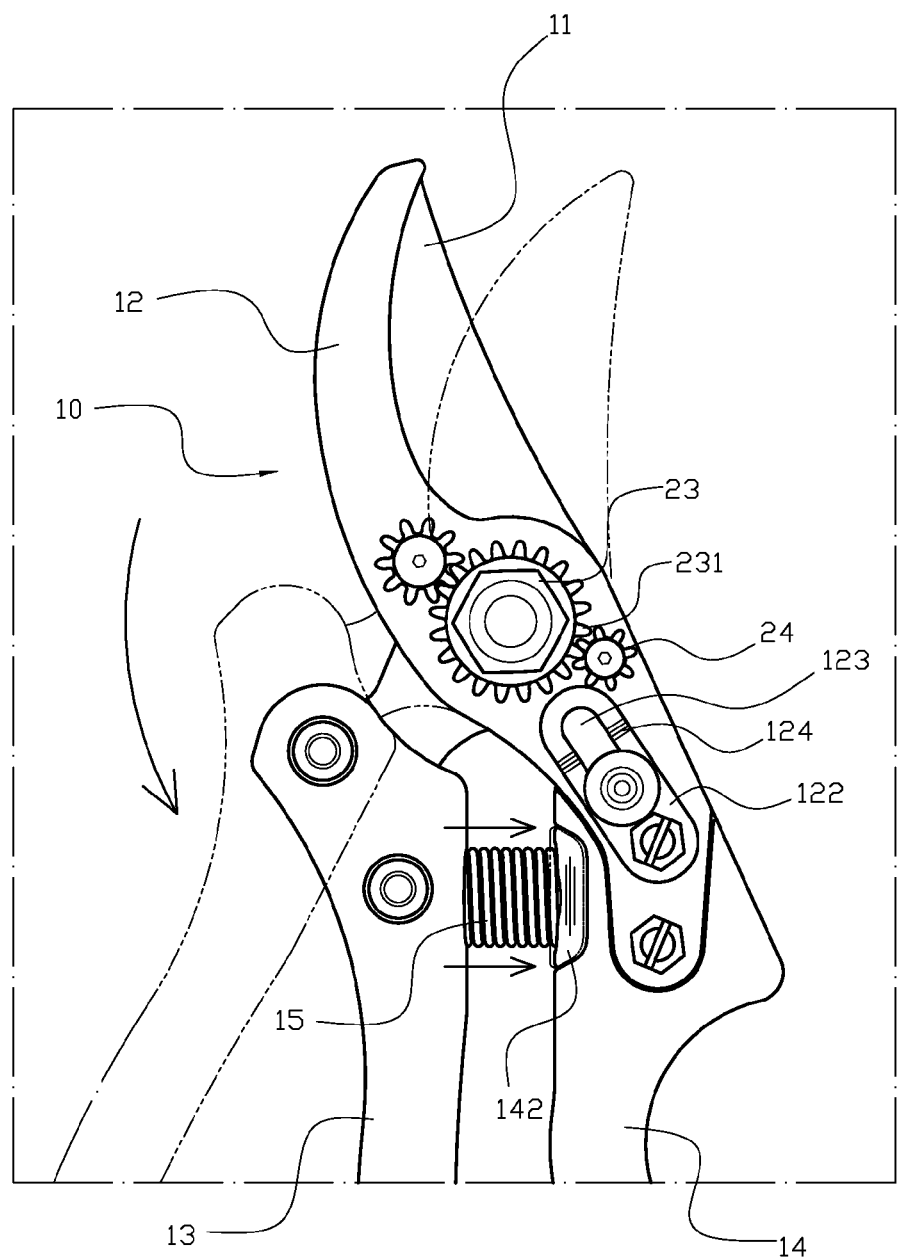
FIG. 6 is a schematic drawing showing a closing movement of an embodiment of the present invention.

Please refer to FIG. 5 and FIG. 6. The shears 10 utilize the elastic member 15 to provide an elastic force that provides resistance to the user and returns the blades to their open position for a complete cutting motion. When the two handles 13, 14 are pressed together to compress the elastic member 15, the buffering block 142 of the second handle 14 is able to suitably reduce the compression pressure from the elastic member 15, to increase the gripping comfort for the user. Since the threaded shaft pin 21 passes through the first and second cutting members 11, 12 and is secured with the threaded securing member 23, which engages with the two engaging members 24 on each side, when the shears 10 are operated the engaging teeth 231 of the threaded securing member 23 engage with the two engaging members 24 to prevent the threaded securing member 23 from loosening due to the repeated opening and closing movements of the shears 10.

Figure 7:
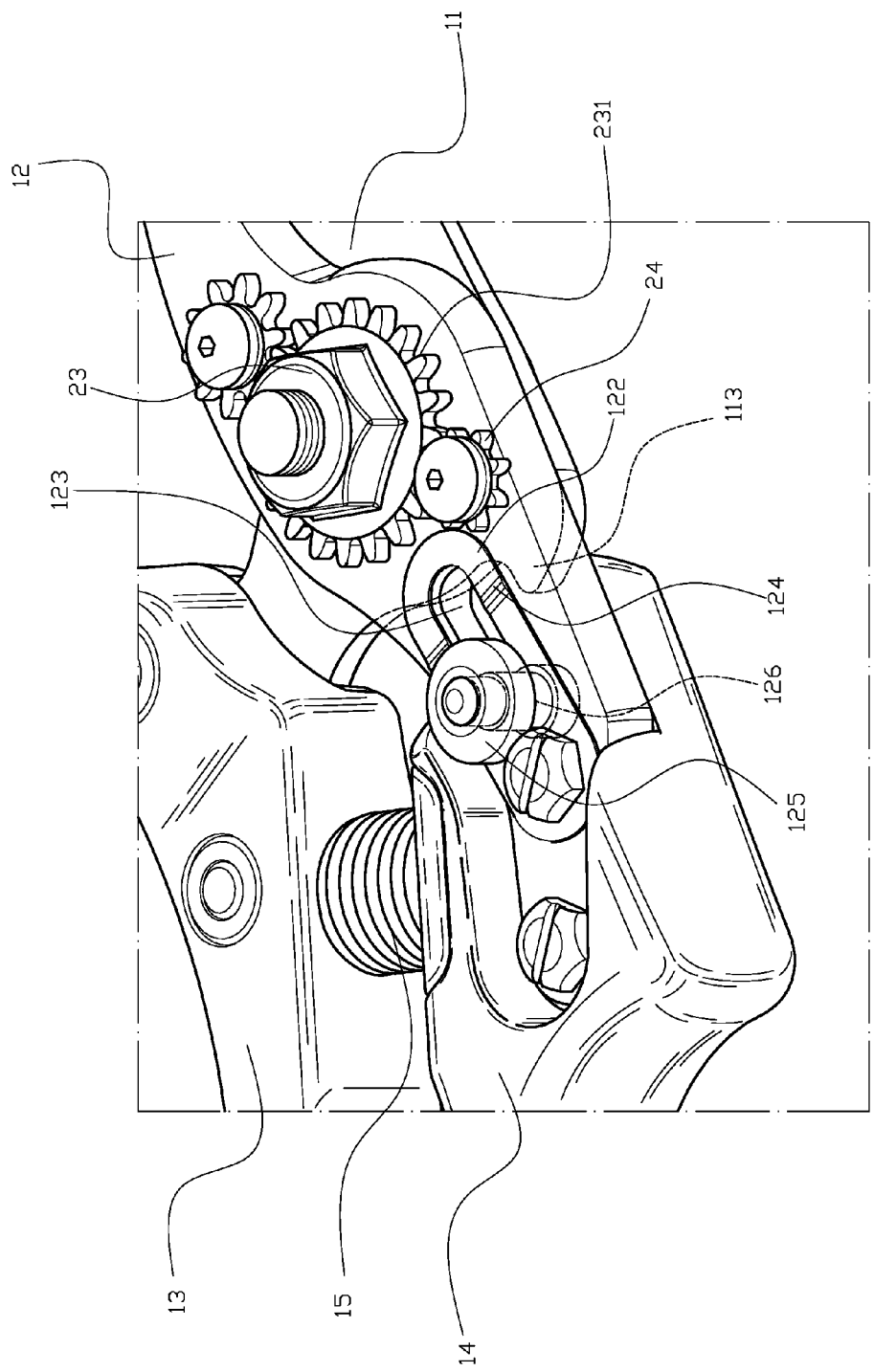
FIG. 7 is a local detailed view of an embodiment being closed but not being locked according to the present invention.
Figure 8:
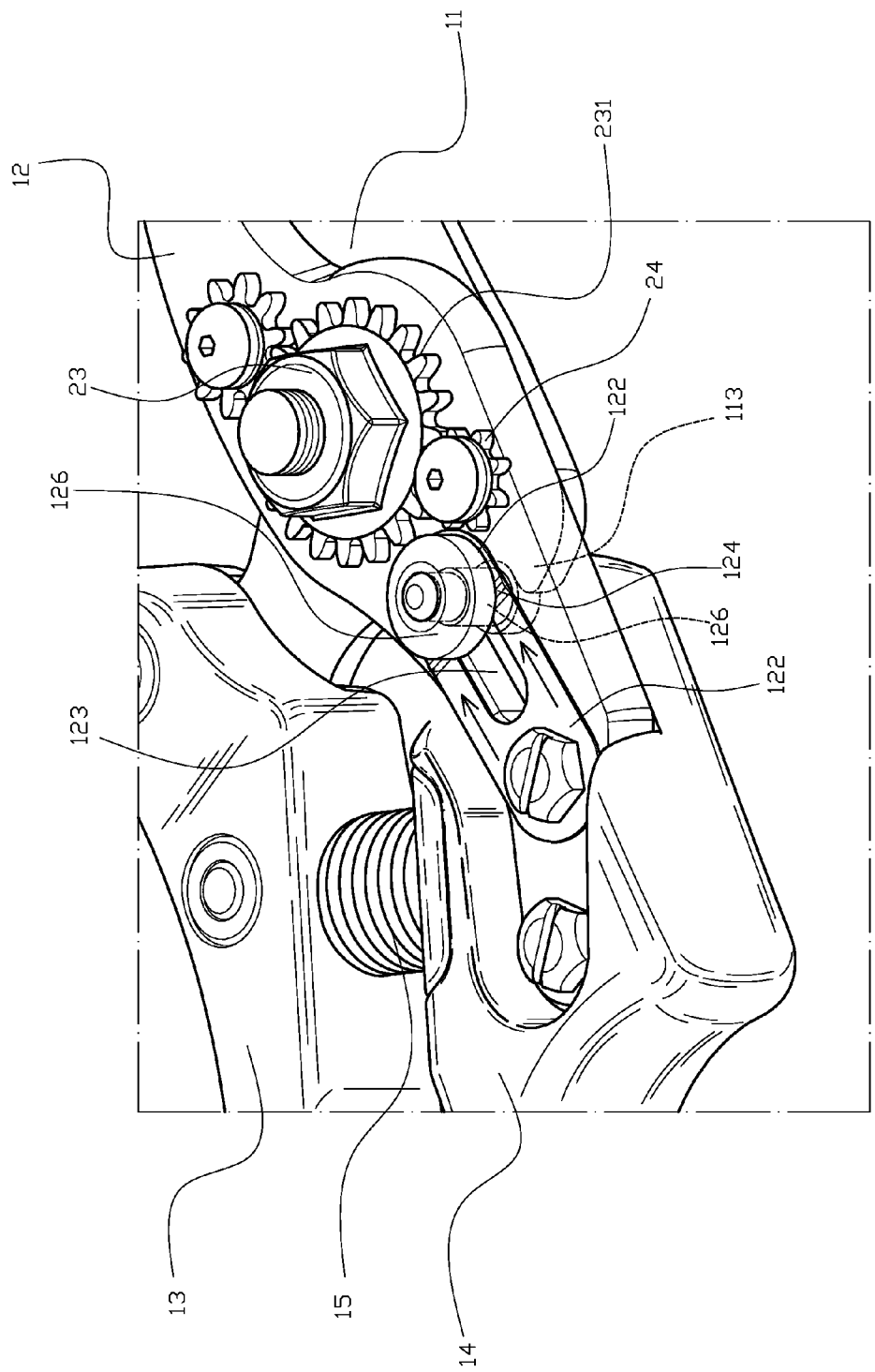
FIG. 8 is a local detailed drawing of an embodiment being closed and locked according to the present invention.
Figure 9:
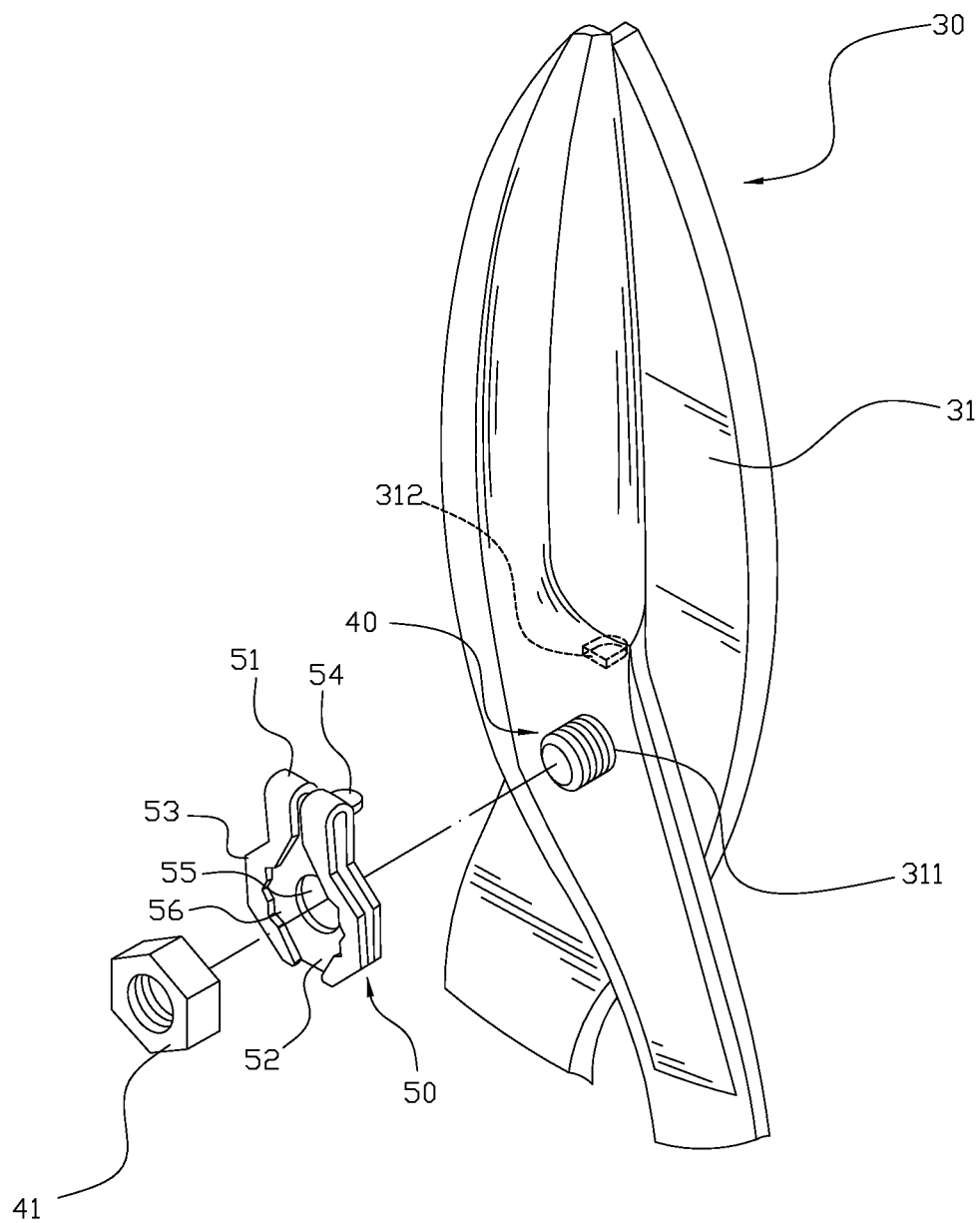
FIG. 9 is a schematic drawing of prior art shears.

Moreover, for storage, please refer to FIG. 7 and FIG. 8. The two handles 13, 14 are pressed together to compress the elastic member 15, such that the first and second engaging columns 131, 143 contact each other and the first and second cutting members 11, 12 are closed together. Meanwhile, the engaging end 113 of the first cutting member 11 aligns with the slot 123 of the second cutting member 12, such that the first positioning member 125 drives the second positioning member 126 to move toward the engaging end 113. The first cutting member 11 and the second cutting member 12 are secured together via the second positioning member 126, and not pushed apart by the elastic member 15. Moreover, the limiting member 122 in the slot 123 further includes the limiting protrusion 124; when the first positioning member 125 is to be locked, it passes the limiting protrusion 124, to a position relative to the first cutting member 11 and the second cutting member 12, such that the first positioning member 125 cannot slide and escape from the slot 123.

With the above-mentioned structure, the following benefits can be obtained: when the shears 10 are assembled with the shaft set 20, the threaded securing member 23 respectively has one engaging member 24 on each side, and the engaging teeth 231 of the threaded securing member 23 engage with the two engaging members 24 to prevent the threaded securing member 23 from loosening due to the repeated opening and closing movements of the shears 10, and which can improve the smoothness of the operation of the shears and increase both safety and convenience.

Although the present invention has been explained in relation to its preferred embodiment, it is to be understood that many other possible modifications and variations can be made without departing from the spirit and scope of the invention as hereinafter claimed.

What is claimed is:

1. Garden shears that avoid loosening of a shaft pin comprising:

shears having overlapped first and second cutting members, the first cutting member and second cutting member respectively connected to a first handle and a second handle, the first cutting member having a through aperture, the first cutting member further having an engaging end extending from a rear end; the second cutting member having a non-circular engaging aperture corresponding to the through aperture of the first cutting member;

a limiting member coupled to an outer side of the second cutting member behind the engaging aperture, a slot disposed in the limiting member and through the second cutting member; the limiting member further having limiting protrusions on a front section of both edges of the slot;

a first positioning member and a second positioning member respectively disposed on two outer sides of the slot and engaged with the slot; the second handle of the second cutting member further having an opening corresponding to the second positioning member; the first handle having a first engaging column and the second handle having a corresponding buffering member, the buffering member having a second engaging column on a side and an elastic member disposed between the two engaging columns; and a shaft set having a threaded shaft pin, a washer, a threaded securing member and at least two engaging members, the engaging members fixed to the second cutting member; the threaded shaft pin comprising a head end, a neck section and a threaded section; the head end having an axial oil filling aperture, an outer wall of the neck section having a gap, an oil outlet connected to the oil filling aperture, and an oil groove around an outer edge of the neck section; a washer correspondingly engaged with the through aperture of the first cutting member and having an assembling aperture; the threaded securing member and the threaded shaft pin capable of being locked together, the threaded securing member further having a plurality of engaging teeth on an outer edge, the at least two engaging members each comprising a plurality of engaging teeth engaged with the engaging teeth of the threaded securing member.

\* \* \* \* \*